(12) United States Patent
La Forest et al.

(10) Patent No.: US 9,017,761 B2
(45) Date of Patent: Apr. 28, 2015

(54) LOW COST, HIGH DENSITY C-C COMPOSITES DENSIFIED BY CVD/CVI FOR AIRCRAFT FRICTION MATERIALS

(75) Inventors: Mark L. La Forest, Granger, IN (US); Neil Murdie, Granger, IN (US); Mark C. James, Plymouth, IN (US)

(73) Assignee: Honeywell International Inc., Morristown, NJ (US)

( * ) Notice: Subject to any disclaimer, the term of this patent is extended or adjusted under 35 U.S.C. 154(b) by 811 days.

(21) Appl. No.: 12/469,384

(22) Filed: May 20, 2009

(65) Prior Publication Data
US 2010/0293769 A1    Nov. 25, 2010

(51) Int. Cl.
| | |
|---|---|
| C23C 16/26 | (2006.01) |
| D04H 1/46 | (2012.01) |
| F16D 69/02 | (2006.01) |
| C04B 35/83 | (2006.01) |
| D04H 1/4242 | (2012.01) |
| D04H 1/498 | (2012.01) |

(52) U.S. Cl.
CPC ............. *F16D 69/023* (2013.01); *C04B 35/83* (2013.01); *C04B 2235/5252* (2013.01); *C04B 2235/614* (2013.01); *C04B 2235/77* (2013.01); *C04B 2235/95* (2013.01); *D04H 1/4242* (2013.01); *D04H 1/498* (2013.01)

(58) Field of Classification Search
None
See application file for complete search history.

(56) References Cited

U.S. PATENT DOCUMENTS

| | | |
|---|---|---|
| 576,671 A | 2/1897 | Hamlin |
| 4,318,955 A | 3/1982 | Kulakov et al. |
| 5,388,320 A | 2/1995 | Smith et al. |
| 5,882,781 A | 3/1999 | Lawton et al. |
| 5,952,075 A * | 9/1999 | Clarke et al. ................. 428/66.2 |
| 6,077,464 A | 6/2000 | Murdie et al. |
| 6,183,583 B1 | 2/2001 | Duval et al. |
| 6,342,171 B1 | 1/2002 | Murdie et al. |
| 6,365,257 B1 * | 4/2002 | Hecht .......................... 428/65.9 |
| 6,537,470 B1 | 3/2003 | Wood et al. |
| 6,691,393 B2 | 2/2004 | James et al. |
| 6,939,490 B2 | 9/2005 | La Forest et al. |
| 7,025,913 B2 | 4/2006 | La Forest et al. |
| 7,172,408 B2 | 2/2007 | Wood et al. |
| 7,252,499 B2 | 8/2007 | LaForest et al. |
| 7,374,709 B2 | 5/2008 | Bauer |
| 2001/0019752 A1 | 9/2001 | Purdy et al. |
| 2002/0170787 A1 * | 11/2002 | James et al. ............ 188/218 XL |
| 2003/0100239 A1 | 5/2003 | Gaffney et al. |
| 2003/0214064 A1 | 11/2003 | Shin et al. |
| 2004/0105969 A1 | 6/2004 | Huang et al. |
| 2006/0046059 A1 | 3/2006 | Arico et al. |
| 2006/0151912 A1 | 7/2006 | Bauer |
| 2006/0177663 A1 | 8/2006 | Simpson et al. |
| 2006/0279012 A1 | 12/2006 | Simpson et al. |
| 2007/0186396 A1 | 8/2007 | Linck et al. |
| 2007/0270069 A1 | 11/2007 | Lee et al. |
| 2008/0041674 A1 | 2/2008 | Walker et al. |
| 2008/0090064 A1 | 4/2008 | James et al. |
| 2009/0194895 A1 | 8/2009 | La Forest et al. |

FOREIGN PATENT DOCUMENTS

| | | |
|---|---|---|
| EP | 1 724 245 A1 | 11/2006 |
| EP | 1 911 990 A2 | 4/2008 |
| EP | 1 911 990 A3 | 4/2009 |
| EP | 2 093 453 A1 | 8/2009 |
| WO | WO-98/27023 A1 | 6/1998 |
| WO | 98/49382 A1 | 11/1998 |
| WO | 00/61518 A1 | 10/2000 |
| WO | WO-2006/101799 A2 | 9/2006 |

OTHER PUBLICATIONS

European Search Report from corresponding EP Application No. 10162744.6, mailed Sep. 8, 2010, 6 pages.
U.S. Appl. No. 12/536,924, titled "Nonwoven Preforms Made With Increased Areal Weight Fabric Segments for Aircraft Friction Materials", filed Aug. 6, 2009.
U.S. Appl. No. 12/617,418, titled "Increased Area Weight Segments With Pitch Densification to Produce Lower Cost and Higher Density Aircraft Friction Materials", filed Nov. 12, 2009.
U.S. Appl. No. 12/576,671, titled "Low Cost, High Density Aircraft Friction Materials Utilizing Low Fiber Volume Nonwoven Preforms With Pitch Densification" filed Oct. 9, 2009.
Examination Report from corresponding EP Application No. 10 162 744.6, mailed Mar. 8, 2011, 5 pages.
Reply to communication from the Examining Division, for EP Application No. 10 162 744.6, mailed Jan. 6, 2011, 10 pages.
Reply to communication from the Examining Division, for EP Application No. 10162744.6, dated Oct. 6, 2011, 7 pages.
Responsive Amendment dated Mar. 19, 2012 for U.S. Appl. No. 12/576,671, 11 pgs.

(Continued)

*Primary Examiner* — Joseph Miller, Jr.
(74) *Attorney, Agent, or Firm* — Shumaker & Sieffert, P.A.

(57) ABSTRACT

Carbon-carbon composites made by needling together woven or nonwoven fabric made from carbon-containing fibers followed by carbonizing the fabric preforms are described. The carbon fiber preforms can be needled either in a carbonized or in an uncarbonized state. The uncarbonized fiber preforms would go through a carbonization/heat-treat step following the needling process. Final preform thickness and fiber volume is also controlled at carbonization, for instance by varying the level of pressure applied to the preforms during carbonization. For example, the preforms may be unconstrained during carbonization (i.e., no pressure is applied to them) or the preforms may be constrained during carbonization, typically by means for applying pressure (e.g., weight placed on top of the preforms). The preforms are then infiltrated via CVD/CVI processing in order to increase their density, resulting in a carbon-carbon composite which is suitable for use as, for instance, a brake disc or pad in aircraft and automotive brake systems.

15 Claims, No Drawings

(56) References Cited

OTHER PUBLICATIONS

Reply to communication from the Examining Division, for EP Application No. 10 176 494.2, dated Jul. 30, 2012, 12 pages.
Examination Report from Counterpart European Patent Application No. 10162744.6, dated Sep. 12, 2014, 3 pp.
Response to Examination Report dated Sep. 12, 2014, from Counterpart European Patent Application No. 10162744.6, filed Sep. 18, 2014, 12 pp.
Amendment in Response to Final Office Action dated May 1, 2012, from U.S. Appl. No. 12/576,671, dated Jul. 2, 2012, 9 pp.
Final Office Action from U.S. Appl. No. 12/576,671, dated May 1, 2012, 19 pp.
Office Action from U.S. Appl. No. 12/576,671, dated Dec. 19, 2011, 20 pp.
Examination Report from corresponding EP Application No. 10 162 744.6, mailed May 31, 2011, 5 pages.
Decision on Appeal from U.S. Appl. No. 12/576,671, dated Feb. 20, 2015, 6 pp.

* cited by examiner

LOW COST, HIGH DENSITY C-C COMPOSITES DENSIFIED BY CVD/CVI FOR AIRCRAFT FRICTION MATERIALS

FIELD OF THE INVENTION

The present invention relates to carbon-carbon composite materials which are useful as friction materials (e.g., brake discs and pads). The carbon-carbon composite preforms are made by needling together woven or nonwoven fabric made from carbon fiber precursors such as polyacrylonitrile fibers or pitch fibers. The carbon fiber preforms are then infiltrated via CVI/CVD processing in order to increase their density.

BACKGROUND OF THE INVENTION

Nonwoven preform technology enables the production of high performance carbon brakes for both aerospace and automotive applications. This technology typically involves needle-punching oxidized polyacrylonitrile ("PAN") nonwoven fabric segments into an annular ring (a "preform") using an annular needling machine. However, the present invention is not necessarily limited to annular needlers. Similar beneficial results can be obtained with other needlers common in the industry for producing carbon preforms.

Competition drives lower cost in the market place for aircraft friction materials. At the same time, the market demands improvements to on-time delivery and superior product performance. In order to help achieve these goals, improvements to the manufacturing processes of C—C composites used as friction materials are constantly being made.

The following patents provide background on the production of carbon-carbon composite friction materials EP 1 724 245 A1 (Simpson et al.) describes a process for producing carbon-carbon composite preform, by: providing short carbon fiber or fiber precursor segments; providing particulate pitch; combining the fiber segments and pitch particles in a mold; subjecting the resulting mixture to elevated pressure to create an uncarbonized preform; placing the preform in a constraint fixture; and carbonizing the combined components in the constraint fixture at an elevated temperature to provide a preform having a desired density.

EP 0 946 455 B1 (Murdie et al.) discloses a carbon-carbon composite material made by providing an open-celled carbon foam preform and densifying the preform with carbonaceous material. The carbon-carbon composite material can be heat treated to provide thermal management materials, structural materials, or friction materials for use in brake or clutch mechanisms.

WO 2006/101799 A2 (Fryska et al.) describes an invention in which small ceramic particles (e.g., of TiC) are incorporated into fibers. The ceramic particles enhance the friction and/or wear properties of a carbon-carbon composite article made with the impregnated or coated fibers.

US 2008/0090064 A1 (James et al.) discloses a carbon-carbon composite material comprising carbonized woven or nonwoven fabric-based preforms. A method taught in this document contemplates densifying the preform and subsequently adding a ceramic additive thereto in order to enhance the properties of the final product.

US 2008/0041674 A1 (Walker et al.) discloses annular drive inserts which are placed within an annular opening within a brake disk. The annular drive inserts may comprise carbon-carbon composite which has been treated with antioxidant.

U.S. Pat. No. 7,374,709 B2 (Bauer) describes a method in which specific end-use application friction requirements are satisfied by tailoring a level of carbon in a selected carbon/carbon preform, heat treating the carbon/carbon composite preform to affect thermal conductivity so as to optimize overall braking performance prior to ceramic processing, and by selecting an optimum level of ceramic hard phase to achieve satisfactory friction disc wear life and friction characteristics of a resulting braking material.

SUMMARY OF THE INVENTION

The carbon-carbon composite materials provided by the present invention are useful as friction materials, such as brake discs and pads. Carbon-carbon composites in accordance with the present invention are made by needling together fabric (woven or nonwoven) made from carbon-containing fibers such as PAN or pitch, followed by carbonizing the fabric (preforms). The carbon fiber preforms can be needled either in the carbonized or in an uncarbonized state. The un-carbonized fiber preforms would have to go through a carbonization/heat-treat step following the needling process. It should be noted that final preform thickness and fiber volume is also controlled at carbonization, for instance by varying the level of pressure applied to the preforms during carbonization. That is, the preforms may be unconstrained during carbonization (i.e., no pressure is applied to them). Or the preforms may be constrained during carbonization, typically by means of applying pressure (e.g., weights placed on top of the preforms). The preforms are then infiltrated via CVD/CVI processing in order to increase their density, resulting in a carbon-carbon composite which is suitable for use as, e.g. a brake disc or pad in both aircraft and automotive brake systems.

The preform manufacturing method described in this invention benefits from lowered manufacturing cycle time, reduced cost of manufacturing, and at the same time increased density of the final composite.

High performance carbon brakes for aerospace and automotive applications are typically provided by needle punching oxidized PAN fibers into a preform using specialized equipment called needlers. The preform is needled to a desired needle-punch density which is controlled by the needle stroke rate, the needle pattern density, and in some cases by rotational speed of the needler bowl. In accordance with the present invention, the needlers are run at a faster rate for shorter time periods, and the fiber volume fraction of the final C—C composite may be reduced, as compared to in the manufacture of conventional aircraft and automotive friction materials. The invention thus results in shortened overall cycle time and reduced material and labor costs.

In one embodiment, this invention provides a method of making a carbon-carbon composite brake disc or pad which comprises the following sequential steps. A fibrous fabric comprised of carbon precursor fibers selected from the group consisting of oxidized polyacrylonitrile fibers, pitch fibers, and rayon fibers is provided. A needler capable of needling layers of said fibrous fabric to one another is provided. A target density and thickness and a target fiber volume fraction for a brake disc or pad preform to be produced are set. The target density of the brake disc or brake pad preform to be produced will typically be 1.70 g/cc or higher; for instance, a target density of the brake disc or pad preform can be in the range 1.75 to 1.80 g/cc. The target thickness of the brake disc or brake pad preform to be produced will typically be in the range 0.75 to 2.5 inches, and sometimes within the range 1.0 to 1.5 inches. The target fiber volume fraction of the brake disc or brake pad preform to be produced is typically in the range 17% to 30%, preferably in the range 17% to 24%, e.g., in the range 20% to 21%.

In this method, two layers of the fibrous fabric are needled to one another and then needling sequential layers of the fibrous fabric are needled on top of the layers thereof which have previously been needled together, while running the needler at a needling rate of greater than 700 strokes per minute. In accordance with the present invention, the needler may be run at a stroke speed of at least 850 strokes per minute, for instance, at a stroke speed of from 850-1250 strokes per minute, to combine the fibrous fabric layers into a fibrous preform. When the needling procedure employed is annular needling, the RPM of the needler bowl may be increased by a factor of at least 50% above a conventional 2 RPM manufacturing speed. When using an annular needler, the first layer of fibrous fabric is typically placed on a pliable material, such as a foam ring, that allows the needles to penetrate without damaging the needles, and subsequent layers of fabric are placed one on top of the other over the foam ring of the needler. This needling step combines the fibrous fabric layers into a brake disc or pad preform. The foregoing steps are continued until the preform composed of needled fabric layers reaches the target density and thickness.

Once the needled fibrous preform has been prepared, the fibrous preform may be carbonized under constraint to obtain the target fiber volume fraction in the final carbon-carbon composite preform. Alternatively, the carbonization of the fibrous fabric preform may be conducted with no constraint, thereby producing a carbon-carbon composite brake disc or pad with lower volume fraction in the final composite and having a density of 1.7-1.8 grams per cubic centimeter. Subsequently, the resulting carbonized needled fibrous fabric preform may be densified via CVD/CVI processing in order to produce a carbon-carbon composite brake disc or pad which has a density of at least 1.70 grams per cubic centimeter. Often, the carbonized preform is die-cut to near net shape prior to the CVD/CVI densification step.

An alternative embodiment of this invention provides a method of making a carbon-carbon composite brake disc or pad which is generally similar to the method described above, but which comprises the following steps: providing a fibrous fabric comprised of carbon precursor fibers selected from the group consisting of oxidized polyacrylonitrile fibers, pitch fibers, and rayon fibers; carbonizing the fibrous fabric; providing a needler capable of needling layers of said fibrous fabric to one another; setting a target density and thickness for a brake disc or brake pad preform to be produced; needling two layers of said fibrous fabric to one another and then needling sequential layers of said fibrous fabric on top of the layers thereof which have previously been needled together, while running the needler at a needling rate of greater than 700 strokes per minute (e.g, 850 strokes per minute or more), thereby combining the fibrous fabric layers into a brake disc or pad preform; continuing the preceding step until the preform composed of needled fabric layers reaches the target density and thickness; and infiltrating the resulting carbonized needled fibrous fabric preform via CVD/CVI processing in order to produce a carbon-carbon composite brake disc or pad which has a density of at least 1.70 grams per cubic centimeter.

Yet another related embodiment of this invention is a method of making a carbon-carbon composite brake disc or pad which comprises the steps of: optionally, pre-carbonizing a fibrous fabric made from oxidized polyacrylonitrile fiber fabric, pitch fiber fabric, or carbon fiber fabric; needling a first layer of pre-cut segments of said fibrous fabric on a foam base in a needler, e.g., and annular needler; layering subsequent layers of pre-cut segments of said fibrous fabric onto the first layer on the foam base in the needler (a foam ring when an annular needler is used); running the needler at a needling rate of greater than 700 strokes per minute or increasing the bowl rotation to greater than 2 revolutions per minute to combine the fibrous fabric layers into a fibrous preform (the RPM of the needler is increased by a factor of at least 50% above conventional manufacturing RPM); continuing the foregoing steps until the needled fabric layers reach the desired thickness, provided that the total duration of needling which is employed to combine the fibrous fabric segments into a fibrous preform does not exceed 12 minutes; where said fibrous fiber fabric has not been pre-carbonized, carbonizing the resulting needled fibrous fabric preform; and infiltrating the resulting carbonized needled fibrous fabric preform via CVD/CVI processing in order to produce a carbon-carbon composite brake disc or pad which has a density of at least 1.70 grams per cubic centimeter. In this embodiment, CVD/CVI infiltration of the carbonized needled fibrous fabric preform may be conducted on a preform which is not constrained, in order to produce a carbon-carbon composite brake disc or pad which has a density of at least 1.75 grams per cubic centimeter.

Very briefly, the present invention employs two separate improvements over conventional processing These improvements involve increasing the needling rate used to manufacture the preform and reducing the amount of fiber used in the preform.

DETAILED DESCRIPTION OF THE INVENTION

In general, for aircraft brake disc applications the needlers are designed to handle either annular or non-annular preform geometries. Typically, for annular preforms the key parameters which affect cycle time and cost are needler stroke speed, bowl rotational speed, and needle pattern density as well as fiber costs. For non-annular preforms, the key process parameters affecting cycle time and cost are needler stroke rate and needle pattern density as well as fiber costs.

In the case of annular preforms, the key process parameters affecting cycle time are needle stroke rate (typically 700 strokes/min) and the rotational bowl speed (typically speed is 2 rpm). Increasing the bowl rotation rate by 50% (3 rpm) while keeping the number of needling strokes per minute at 350:1 allows the cycle time which is necessary to produce the preform to be reduced by about 33%. Another cost advantage from the faster cycle time is the reduction in capital investment necessary to produce a given quantity of preforms.

Reducing the volume fraction of carbon fiber used in the final composite leads to reduced materials costs and cycle times. The fiber volume fraction of the final carbonized preform can be controlled during the carbonization process by the amount of pressure applied to the preforms (constrained to unconstrained). In addition to the reduced material costs, and reduced capital investments, overall labor cost is also reduced through shorter cycle times.

An additional benefit obtained from a lower volume fraction of carbon fiber used in the preform is that the final density of the C—C composite can be increased, or for a given final density, the number of cycles of CVD required can be reduced. The increase in final density is achieved by replacing the lower density carbon fibers in the preforms with higher density carbon deposited via CVD/CVI processing. That is, more open (less densely packed) fabric layers may be employed. Not only is the PAN fiber (fabric) less dense than the CVI/CVD carbon, a more open fabric has wider, deeper pores, which are easier to infiltrate by CVD/CVI processing. Therefore, fewer CVD/CVI cycles are required to meet final density requirements, thereby providing additional capital avoidance for CVD/CVI investment.

Manufacturing Parameters.

Typically, this invention employs oxidized fibers to make the preforms and subsequently the carbon-carbon composite friction materials (e.g., brake discs and pads). The oxidized fibers may be subjected to low temperature or high temperature heat treatments in accordance with techniques that are known in the art. The oxidized fibers are generally used in the form of woven or nonwoven oxidized fabrics. The oxidized fabrics may be subjected to low temperature or high temperature carbonization processing in accordance with techniques that are known in the art. The oxidized fabrics may be joined together in the present invention by rotating annular needling, by non-rotating annular needling, or by non-annular needling. In each case, an optional constrained or unconstrained carbonization step may be employed. Likewise in each case, and optional die cutting step may be employed. In each case, subsequent to the carbonization and/or die cutting step if used, a CVD/CVI step is employed. In each case, an optional heat treatment step may be employed after the CVD/CVI step. The carbon-carbon composite is then subjected to a final machining step.

General Discussion.

Disclosure relevant to the needling technology which is improved upon in the present invention may be found in U.S. Pat. No. 5,338,320—PRODUCTION OF SHAPED FILAMENTARY STRUCTURES, U.S. Pat. No. 5,882,781—SHAPED FIBROUS FABRIC STRUCTURE COMPRISING MULTIPLE LAYERS OF FIBROUS MATERIAL, and U.S. Pat. No. 6,691,393 B2—WEAR RESISTANCE IN CARBON FIBER FRICTION MATERIALS. The disclosure of each of U.S. Pat. No. 5,338,320, U.S. Pat. No. 5,882,781 and U.S. Pat. No. 6,691,393 B2 is incorporated herein by reference.

A non-annular needler does not need a foam ring. Typically a base plate with holes that match the needle pattern is used, since there is no bowl and there is no rotation of the bowl. A foam ring (or similar pliable, soft material) is only required for an annular needler.

Following manufacture of the preform, it is the carbonization step that is used (constrained or unconstrained) to control the final volume fraction of the final composite (and final density). If a preform has the same amount of fiber as the baseline preform material, the final fiber volume fraction of the composite can be decreased and final density can be increased if non-constrained carbonization is used (but the composite would be thicker). If a preform has less fiber than the baseline preform material, the final volume fraction and density could be kept the same as the baseline if the carbonization is constrained (but a thinner preform would result). But if carbonization is left unconstrained, the final composite would have lower fiber volume fraction, and higher density (with same thickness (compared with baseline).

The fabrics—for instance, nonwoven PAN segments—are commercially available. In accordance with the present invention, they are needled as described herein, then carbonized (that is, converted to carbon fiber) at temperatures in the range 1000-2700° C. They are then die-cut to a nominal size (if required) for a given platform, and densified by CVD/CVI processing. Finally, they are subjected to a final heat treatment at a temperature typically in the range 1000-2540° C.

Carbonization.

The carbonization process as it is applied to carbon-fiber precursor fibrous materials is in general well known to those skilled in the art. The fiber preforms are typically heated in a retort under inert or reducing conditions to remove the non-carbon constituents (hydrogen, nitrogen, oxygen, etc.) from the fibers. Carbonization can be carried out either in a furnace, a hot isostatic press, an autoclave, or in a uniaxial hot press. In each of these techniques, the fibrous fabric is heated to the range of 600° to about 1000° C. while maintaining an inert atmosphere in the pressure range of 1 to 1000 atmospheres. In one approach, for instance, the retort may be purged gently with nitrogen for approximately 1 hour, then it is heated to 900° C. in 10-20 hours, and thence to 1050° C. in 1-2 hours. The retort is held at 1050° C. for 3-6 hours, then allowed to cool overnight. Carbonization is typically carried out up to 1800° C.

CVD/CVI.

Chemical vapor deposition (CVD) of carbon is also known as chemical vapor infiltration (CVI). In a CVD/CVI process, carbonized, and optionally heat treated, preforms are heated in a retort under the cover of inert gas, typically at a pressure below 100 torr. When the parts reach a temperature of 900° to 1200° C., the inert gas is replaced with a carbon-bearing gas such as natural gas, methane, ethane, propane, butane, propylene, or acetylene, or combinations of these gases. When the hydrocarbon gas mixture flows around and through the fiber preform porous structures, a complex set of dehydrogenation, condensation, and polymerization reactions occur, thereby depositing the carbon atoms within the interior and onto the surface of the fiber preform porous structures. Over time, as more and more of the carbon atoms are deposited onto the carbon fiber surfaces, the fiber preform becomes more dense. This process is sometimes referred to as densification, because the open spaces in the fiber preform are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. US 2006/0046059 A1 (Arico et al.), the disclosure of which is incorporated herein by reference, provides an overview of CVD/CVI processing.

Heat Treatment.

Intermediate and/or final heat treatment of the preforms is usually applied to modify the crystal structure of the carbon. Heat treatment is employed to modify the mechanical, thermal, and chemical properties of the carbon in the preform. Heat treatment of the preforms is typically conducted in the range of 1400° to 2800° C. The effect of such a treatment on graphitizable materials is well known. Higher temperatures increase the degree of crystalline order in the carbon material, as measured by such analytical techniques as X-ray diffraction or Raman spectroscopy. Higher temperatures also increase the thermal conductivity of the carbon in the products, and the elastic modulus of the final C—C composite.

Example 1

Rotating Annular Needlers

Pre-cut segments of oxidized polyacrylonitrile (O-PAN) fiber nonwoven fabric are layered on a foam ring in a needler. The segments are pre-cut based upon the size of the friction article to be produced. In the case of example 1 the RPM of the needler is increased by a factor of 50% (compared to baseline condition) while maintaining the needling strokes per minute and bowl RPM at a ratio of 350:1. The needles, which have hooked (barbed) ends, push through the PAN fiber segments and bind each subsequent layer by punching, pushing, or pulling loose fibers through each layer during the downstroke and upstroke. It should be noted that the first layer is needled to the foam ring. Additional needling of layers continues until the desired weight and thickness (density) is achieved. The preform is then carbonized and die-cut (if required), and subsequently subject to densification and other manufacturing steps.

In this case, the benefit is related to reduced cycle time (about 33%) and capital requirements obtained through increased throughput.

Example 2

Rotating Annular Needlers

In the second example the same process steps used in Example 1 are repeated with the following exceptions. The number of segments used to make the preform are reduced. The needler settings are kept the same as in Example 1. The carbonized preform volume fraction is reduced to 19-24 (compared with 25-30% in the baseline). This reduced fiber volume fraction in the carbonized and final C—C composite is obtained through the absence of any pressure applied during carbonization (unconstrained).

The benefits of this process are: reduction in cycle time (about 46%) compared to the baseline conditions; reduction in materials cost (about 22%) compared to the baseline; capital savings due to the need for fewer needlers; reduced number of CVD/CVI cycles to achiever a given final density; and improved final density (~1.7-1.8 g/cc) of the C—C composite through replacement of low density PAN fiber with high density CVD/CVI.

Example 3

Non-Rotating Annular Needlers

In the third example the same process steps used in Example 1 are repeated with the following exceptions. The needler used is non-rotating. The needler settings are kept the same as in Example 1. The benefits of this process are the same as for Example 1.

Example 4

Non Annular Preform Geometries

In the fourth example the same process steps used in Example 1 are repeated with the following exceptions. The needler used is non-annular and the carbonization is unconstrained so that the fiber volume fraction in the final composite is between 19-24%.

The benefits of this process are: reduction in cycle time (about 46%) compared to the baseline conditions and about 20% compared to Example 3; capital savings due to the need for fewer needlers; improved final density (about 1.7-1.8 g/cc) of the C—C composite through replacement of low density PAN fiber with high density CVD/CVI; and reduced number of CVD/CVI cycles to achieve a given final density.

The foregoing Examples are summarized in Tables 1 and 2 which follow.

TABLE 1

| Process Step | Rotating Annular Baseline | Rotating Annular Example 1 | Rotating Annular Example 2 |
|---|---|---|---|
| Fiber Type | Oxidized PAN | Oxidized PAN | Oxidized PAN |
| Fabric Composition | 85% ContinuousTow 15% Staple | 75% ContinuousTow 25% Staple | 85% ContinuousTow 15% Staple |
| Fabric Weight | 1000 grams/square meter | 1000 grams/square meter | 1000 grams/square meter |
| Fabric Type | Needle punched nonwoven | Needle punched nonwoven | Needle punched nonwoven |
| Segment Dimensions | Inside Radius: 6 inches Outside Radius: 12 inches Arc: 68 degrees | Inside Radius: 6 inches Outside Radius: 12 inches Arc: 68 degrees | Inside Radius: 6 inches Outside Radius: 12 inches Arc: 68 degrees |
| Needler Settings | Bowl Rotation: 2 rpm Needler Stroke: 700 spm Ratio: 350 to 1 | Bowl Rotation: 3 rpm Needler Stroke: 1050 spm Ratio: 350 to 1 | Bowl Rotation: 3 rpm Needler Stroke: 1050 spm Ratio: 350 to 1 |
| Oxidized PAN Preform | Preform Wt: 6350 grams Preform Thk: 1.900 inches | Preform Wt: 6350 grams Preform Thk: 1.900 inches | Preform Wt: 4940 grams Preform Thk: 1.480 inches |
| Needling Time (minutes) | Needling Time: 15 minutes | Needling Time: 10 minutes | Needling Time: 8 minutes |
| Carbonization Temperature | 1650 Centigrade | 2000 Centigrade | 2100 Centigrade |
| Carbonized Preform Fiber Volume (%) | 25-30 (Constrained) | 25-30 (Constrained) | 19-24 (Unconstrained) |
| Carbonized Preform | Preform Wt: 2950 grams Preform Thk: 1.400 inches | Preform Wt: 2950 grams Preform Thk: 1.400 inches | Preform Wt: 2300 grams Preform Thk: 1.400 inches |
| Preform Densification | CVI/CVD | CVI/CVD | CVI/CVD |
| Composite Final Density | ~1.70 grams/cc | ~1.70 grams/cc | ~1.70-1.80 grams/cc |

TABLE 2

| Process Step | Non-Rotating Annular Example 3 | Non-Annular Example 4 |
|---|---|---|
| Fiber Type | Oxidized PAN | Oxidized PAN |
| Fabric Composition | 65% ContinuousTow 35% Staple | 65% ContinuousTow 35% Staple |
| Fabric Weight | 1000 grams/square meter | 1000 grams/square meter |
| Fabric Type | Needle punched nonwoven | Needle punched nonwoven |

TABLE 2-continued

| Process Step | Non-Rotating Annular Example 3 | Non-Annular Example 4 |
|---|---|---|
| Segment Dimensions | Inside Radius: 6 inches Outside Radius: 12 inches Arc: 360 degrees | Length: 28 inches Width: 28 inches Arc: N/A |
| Needler Settings | Bowl Rotation: N/A Needler Stroke: 875 rpm Ratio: N/A | Bowl Rotation: N/A Needler Stroke: 875 rpm Ratio: N/A |
| Oxidized PAN Preform | Preform Wt: 6350 grams Preform Thk: 1.900 inches | Preform Wt: 11600 grams Preform Thk: 1.500 inches |
| Needling Time (minutes) | Needling Time: 10 minutes | Needling Time: 8 minutes |
| Carbonization Temperature | 2400 Centigrade | 2400 Centigrade |
| Carbonized Preform Fiber Volume (%) | 25-30 (Constrained) | 19-24 (Unconstrained) |
| Carbonized Preform | Preform Wt: 2950 grams Preform Thk: 1.400 inches | Preform Wt: 5390 grams Preform Thk: 1.400 inches |
| Preform Densification | CVI/CVD | CVI/CVD |
| Composite Final Density | ~1.70 grams/cc | ~1.70-1.80 grams/cc |

What is claimed is:

1. A method of making a carbon-carbon composite brake disc or pad, the method comprising:
   needling, via a needler, two layers of a fibrous fabric to one another at a needling rate greater than 700 strokes per minute, wherein the fibrous fabric comprises at least one of oxidized polyacrylonitrile fibers, pitch fibers, or rayon fibers;
   needling, via the needler, subsequent layers of the fibrous fabric on top of the two needled layers at the needling rate greater than 700 strokes per minute until the fibrous fabric layers form a brake disc or pad preform defined by a target thickness;
   carbonizing the preform to reduce a fiber volume fraction of the preform, wherein carbonizing comprises carbonizing the preform until the fiber volume fraction of the preform is between approximately 17% and approximately 30%; and
   infiltrating the carbonized preform via chemical vapor deposition/chemical vapor infiltration (CVD/CVI) processing until the infiltrated carbonized preform forms the carbon-carbon composite brake disc or pad defined by a density of at least 1.70 grams per cubic centimeter.

2. The method of claim 1, further comprising die-cutting the carbonized preform to near net shape prior to the CVD/CVI infiltration step.

3. The method of claim 1, wherein the density of the carbon-carbon composite brake disc or pad is between approximately 1.75 grams per cubic centimeter and approximately 1.80 grams per cubic centimeter.

4. The method of claim 1, wherein the target thickness of the brake disc or pad preform is between approximately 0.75 inches and approximately 2.5 inches.

5. The method of claim 1, wherein the target thickness of the brake disc or pad preform is between approximately 1.0 inches and approximately 1.5 inches.

6. The method of claim 1, wherein carbonizing the preform comprises carbonizing the preform until the fiber volume fraction of the preform is between approximately 17% and approximately 24%.

7. The method of claim 1, wherein carbonizing the preform comprises carbonizing the preform until the fiber volume fraction of the preform is between approximately 20% and approximately 21%.

8. The method of claim 1, wherein carbonizing the preform comprises carbonizing the preform while unconstrained.

9. The method of claim 1, wherein the needler comprises a needler bowl, and wherein needling the two layers via the needler and needling the subsequent layers via the needler comprises needling the two layers and needling the subsequent layers via the needler bowl at a rotational speed of at least three revolutions per minute.

10. The method of claim 1, wherein the needler comprises an annular needler, and wherein the method further comprises placing the first layer of fibrous fabric on a pliable material such that one or more needles penetrate the first layer without damaging the needles.

11. The method of claim 10, wherein the pliable material comprises a foam ring, wherein the method further comprises placing the subsequent layers of fabric on top of one another over the foam ring.

12. The method of claim 1, wherein the needling rate is at least 850 strokes per minute.

13. The method of claim 1, wherein the needling rate is between approximately 850 and approximately 1250 strokes per minute.

14. The method of claim 1, wherein needling the two layers of the fibrous fabric and needling the subsequent layers of the fibrous fabric comprises needling for a duration of approximately twelve minutes or less.

15. The method of claim 1, wherein the needler comprises an annular needler, and wherein needling the two layers of the fibrous fabric and needling the subsequent layers of the fibrous fabric comprises needling at a bowl rotation of greater than two revolutions per minute (RPMs).

* * * * *